UNITED STATES PATENT OFFICE.

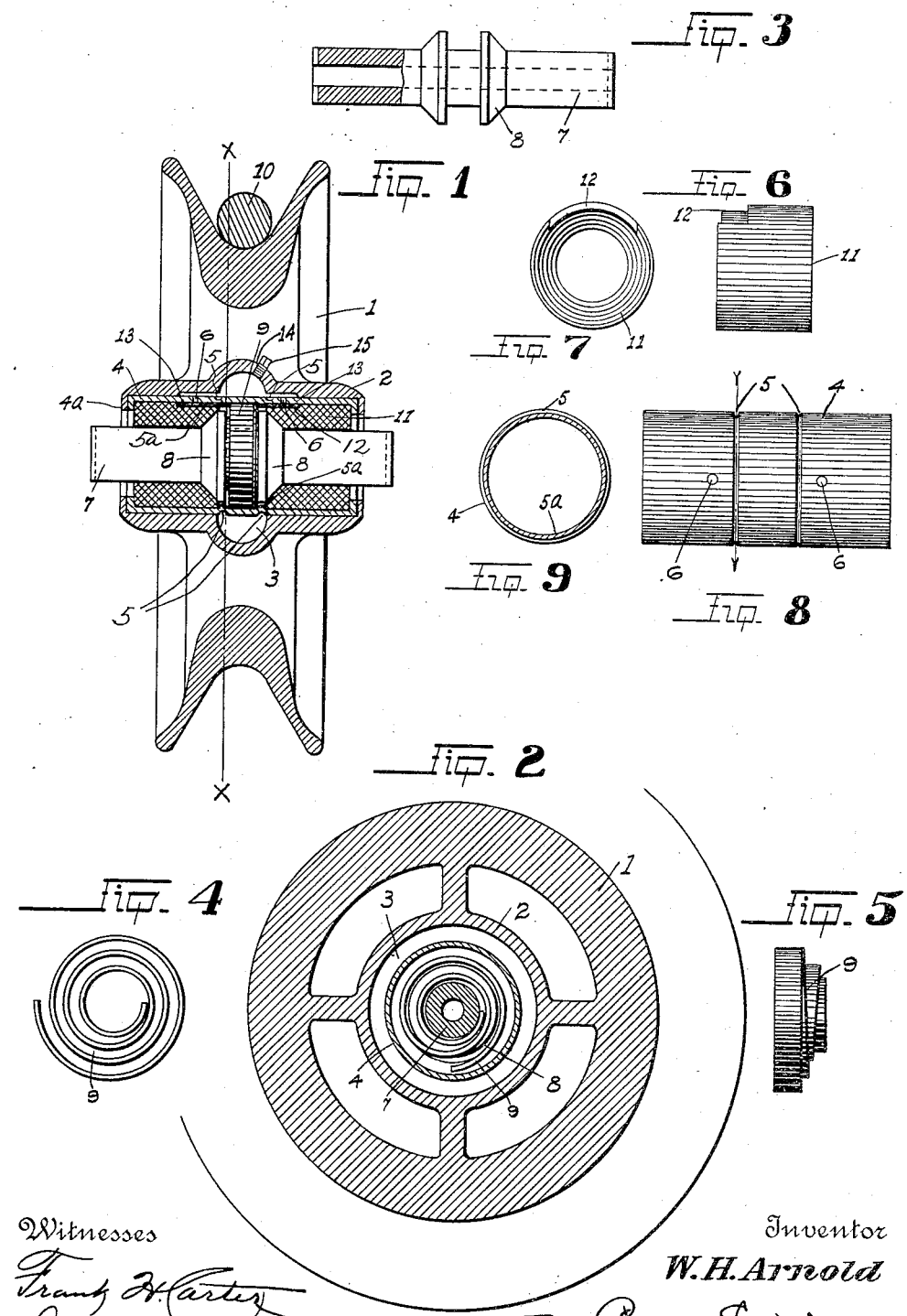

WILLIAM H. ARNOLD, OF STOCKTON, CALIFORNIA.

WHEEL-BEARING.

1,065,424. Specification of Letters Patent. Patented June 24, 1913.

Application filed March 20, 1912. Serial No. 684,976.

*To all whom it may concern:*

Be it known that I, WILLIAM H. ARNOLD, a citizen of the United States, residing at Stockton, in the county of San Joaquin and State of California, have invented certain new and useful Improvements in Wheel-Bearings; and I do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in wheel bearings of all kinds and descriptions, the particular adaptation of the same being applied to a trolley wheel and comprising in combination with such trolley wheel an inner contact mechanism adapted to carry a continuous current directly from the trolley wire to the bearing pin of the wheel and then to the machinery doing away with all friction caused by outside contact springs and the necessary plates used in the present construction of trolley wheels.

A further object of the invention is to produce a wheel bearing which will have a minimum amount of friction and which can be operated with a plain bronze bushing and be non-leakable with respect to the oil used thereon.

A further object of the invention is to produce a simple and inexpensive device and yet one which will be exceedingly effective for the purposes for which it is designed.

These objects I accomplish by means of such structure and relative arrangement of the parts as will fully appear by a perusal of the following specification and claim.

On the drawings similar characters of reference indicate corresponding parts in the several views.

Figure 1 is a sectional view of a trolley wheel showing my improved structure therein. Fig. 2 is a sectional view taken on a line X—X of Fig. 1. Fig. 3 is a side elevation partly in section of a bearing cone. Fig. 4 is an end elevation of a contact spring. Fig. 5 is a side elevation of the same. Fig. 6 is a side elevation of a bushing. Fig. 7 is an end view of the same. Fig. 8 is a side elevation of a casing. Fig. 9 is a sectional view taken on a line Y—Y of Fig. 8.

Referring now more particularly to the characters of reference on the drawings, 1 designates a trolley wheel having a hub 2 provided with a central enlarged oil chamber 3. Disposed within said hub 2 is an outer brass cylindrical shield or casing 4 provided with two annular grooves 5 and with orifices 6. Within said casing 4 is a bearing pin 7 having two annular conical shoulders 8 spaced apart near the center between which is disposed a helical band spring 9 which bears on its outer edges against the inside of the casing 4. The apex of said spring bears continuously against one of the shoulders 8 thus forming a continuous contact from the wire 10 through the wheel 1, hub 2, casing 4, spring 9, shoulder 8 and pin 7 thence through the trolley harp in which said pin 7 will rest and thence to the machinery in the usual manner.

Projected into the casing 1 and around the pin 7 and shoulders 8 are two independent metal bushings 11 having recesses 12 cut in their inner ends to receive felt 13, which felt is disposed between the casing 4 and the bushings 11 at the point where the holes 6 are located.

The numeral 14 designates an oil hole for filling the oil chamber 3 and is provided with a tapered pipe plug 15 in order to make the same oil tight when in use.

In practice the bushings 11 at their inner ends abut against the flanges 5ª formed by the grooves 5 and then the upper ends of the casing 4 are bent over the ends of said bushing 11 as at 4ª thus holding said bushings securely in place while the members 5ª prevent them from binding on the shoulders 8. The casing 4 is held in the hub 2 by means of bending the ends of the hub 2 over the same.

In practice the oil is filled into the chamber 3, which chamber is then closed by means of the plug 15. The oil then flows from said chamber 3 through the holes 6 and is absorbed by felt 13. From this felt it leaks down between the bushing 11 and the shoulders 8 and pin 7 thus keeping the same thoroughly oiled against friction. The structure just described however prevents the oil from leaking out from between the ends of the bushings 11 and the pin 7 and this is accomplished in the following manner, to wit: The centrifugal motion caused by the wheels moving rapidly around the pin 7 tends to throw the oil at all times toward the outer sides of such chamber and likewise the centrifugal motion prevents an excess of oil to be absorbed and held by the felt 13 and hence only a sufficient amount of oil is permitted at once through the bushings 11 and the shoulders 8 and pin 7 to keep the same free from frictional heat. For this reason I have discovered from practice that a small amount of oil placed in the chamber 3 will last a very long time even if the wheel were running at a very high rate of speed.

From the foregoing description it will be readily seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

A device of the character described comprising a wheel, a hub on said wheel, such hub being provided with an annular recess, a casing within said hub, a pin within said casing having two shoulders spaced apart, bushings projecting into said casing and bearing on said shoulders and around said pin, said bushings being provided with recesses, felt disposed in said recesses, and means communicating from said annular recess through said casing to said felt, as described.

In testimony whereof I affix my signature in presence of two witnesses.

WILLIAM H. ARNOLD.

Witnesses:
JOSHUA B. WEBSTER,
STEPHEN N. BLEWETT.

Copies of this patent may be obtained for five cents each, by addressing the "Commissioner of Patents, Washington, D. C."